Patented Feb. 13, 1945

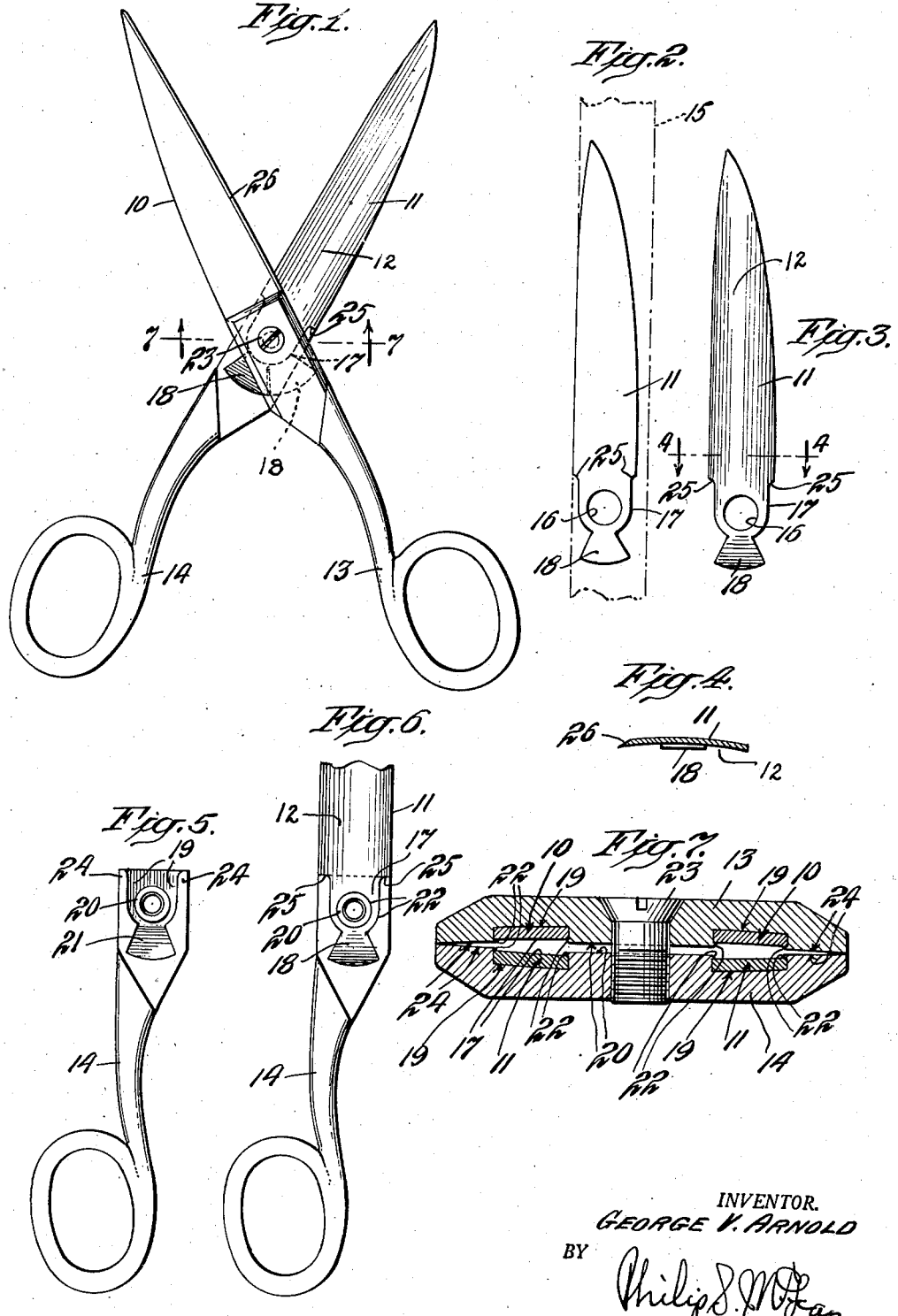

2,369,271

UNITED STATES PATENT OFFICE 2,369,271

SHEARS OR SCISSORS

George V. Arnold, Irvington, N. J.

Application February 11, 1944, Serial No. 522,198

1 Claim. (Cl. 30—260)

The invention here disclosed relates to cutting tools in the nature of scissors and shears.

Objects of the invention are to provide a high quality tool of this character which can be produced at low cost and with use of a minimum amount of high grade materials.

These objects are attained in part by forming the blades of high grade thin sheet steel, transversely bowed, to give the required stiffness and attaching the blade members so formed to handle levers of less expensive material.

Associated or related objects are to effect the organization of the blade and handle elements in such a way as to one actually reinforce the other, to brace the blade members in the cutting plane and in planes at angles thereto, so that the tool will have full strength and cutting ability and also to combine the parts so as to tension the blade portions in self-sharpening relation.

Further desirable objects will appear as the specification proceeds.

In the drawing, there is illustrated a present practical embodiment of the invention, but it is to be realized that changes and modifications may be made, all within the true intent and broad scope of the invention as hereinafter defined and claimed.

Fig. 1 is a plan view of a pair of scissors incorporating features of the invention.

Fig. 2 is a broken plan illustrating the step of blanking the blades out of strip steel stock.

Fig. 3 is a plan of a blade blank formed into transverse curvature and with the leverage extension at the end of the same pressed flat to serve as a brace and bearing lug.

Fig. 4 is a cross-sectional view as on substantially the plane of line 4—4 of Fig. 3.

Fig. 5 is a detail on one of the molded handle parts.

Fig. 6 is a similar view showing the blade element seated and secured therein.

Fig. 7 is an enlarged sectional view across the pivot connection of the tool, taken on substantially the plane of line 7—7 of Fig. 1.

As shown in Fig. 1, the shear or scissors comprises companion blades 10, 11, of thin sheet steel transversely hollowed or bowed as indicated at 12, and carried by pivotally connected handle levers 13, 14, of less expensive material, molded or otherwise suitably shaped.

The blades, as indicated in Fig. 2, may be struck or cut from flat strip stock represented at 15. While the particular shape of the cutting portion of the blade may vary, the root or base portion may be shaped as indicated, that is, with a relatively large substantially centrally disposed circular hole 16, a shank portion 17, of reduced width, about the hole and a non-circular projecting end extension 18.

The thin strip or sheet material from which the blade is cut may be of high grade, bright tool steel and the blanks are cut from the stock before hardening.

Fig. 3 shows the blade blank bowed transversely to give it the desired stiffness and to provide the hollow ground effect, giving the blades a self-sharpening character.

Figs. 3 and 4 show how the longitudinal anchorage extension 18, of the blade is either left in the flat plane of the original stock or pressed to that flat condition after transverse curvature of the cutting portion. This is to locate the end surface of the leverage extension in a plane substantially corresponding to that of the cutting plane so that one such extension will slide over the face of the other in the use of the tool to act as a bearing, bracing and supporting the cutting edge of the blade.

Fig. 5 illustrates one of the handle members before attachment of the blade thereto.

The special features of this handle member are that it is molded or otherwise formed to the desired shape in some inexpensive base material, such as ordinary die casting metal, plastic or the like, and that in its formation, it is produced with a parallel-sided seat 19, in the face of the same to receive the reduced shank portion 17, of the blade, a substantially circular boss 20, to fit the opening 16, and a shallower longitudinal seat 21, to receive the flat extending tang or tongue 18.

Figs. 6 and 7 show how the softer material of the handle levers may be upset or riveted over the seated or embedded portions of the blades at 22, to permanently fasten the parts together.

The blades are hardened before attachment to the handles, so that any desired pressure may be applied in the assembling operation, without danger of deforming the sheet metal structure. The seats for the blades are shown in Fig. 7 as concavely curved to approximately fit the transverse curvature of the blades. The holes in the butt ends of the blades are of relatively large diameter, to admit securing bosses 20, of as large size as possible. This is for blade holding purposes and also to allow for a good sized pivot connection. An ordinary screw such as indicated at 23, may be used, but if desired, any special form of pivot connection may be employed, such as any one of the self-tensioning connections known in the art. The circular bosses on the handles and circular holes in the blades permit the blades to be rotated slightly in starting them over the ends of the bosses and this circular form of rivet connection is desirable over an angular type of cross section in enabling a more uniform and secure fastening of the parts together.

The narrowing of the shank portions of the blades to less than the width of the handles allows for the provision of ledges 24, along opposite sides of the seats 19, which will engage and cover those edge portions of the blades which are seated in the handles. This braces the blades and also conceals and covers the edge portions which are embedded within the handles.

A further advantage of this construction is that the ends of the ledges engage the transverse shoulders 25, at the junctions of the shanks with the full width portions of the blades to brace and rigidly hold the blades in the handles.

The leverage extensions 18, may be elongated as much as necessary but the proportions illustrated can be taken as representative for general purposes, particularly in view of the manner described, in which the blades are keyed in the handles at both sides of the shanks and by the engaging transverse shoulders, which latter it will be noted, are disposed at the blade side of the pivot and accordingly at the opposite side from the leverage extensions. The scissors or shears so constructed can be light in weight as compared to the usual one-piece blade and handle constructions, but can be just as strong and they can be superior in cutting action, at lower cost, because of the use of a smaller amount of, but the best grade cutting steel in the blades and because of the self-sharpening hollow formation of the latter. The oversliding engagement of the combined leverage and bearing lugs 18, enables the blades to keep their tensioned engagement indefinitely and enables the scissors to be used for heavier than usual work without injury.

The cutting edges 26, may be put on the blades after they have been attached to the handles by simply passing the blade portions across the face of a grinding wheel.

The handles may be die cast or produced by any other shaping operation and the term molded, as applied to such members has been used in that broad sense. Similarly, other terms have been employed in a descriptive, rather than in a limiting sense, except possibly as state of the art may impose any such limitations.

To afford ample bearing engagement and to prevent the edges catching over each other, the anchorage lugs 18, may be widened out or flared toward their ends, as illustrated, so that, as indicated in Fig. 1, they will maintain their oversliding relation in the normal use of the tool. These fan-like extensions of the blades also make dovetail interlocking engagement in the handles to anchor the blades more firmly in place.

What is claimed is:

Scissors or shears comprising companion blades of thin sheet metal, hollow curved in transverse cross section and having openings through the base and portions of the same and flat leverage extensions at the extreme ends, projecting beyond said openings, crossed handles having concave end seats in the opposing faces of the same, tubular pivot studs projecting up from said concave seats and flat extensions of said seats extending longitudinally beyond said tubular pivot studs, the curved base portions of the thin sheet metal blades being disposed in said concave seats, with the tubular studs extending through the openings in said blades and the flat leverage extensions of the blades disposed in the flat extensions of said concave seats, the handles having longitudinally extending ledges along the opposite edges of the concave seats, covering the opposite edges of the concavely curved base portions of the blades, the material of the handles being headed over edge portions of the blades seated therein to permanently secure the blades in the handles, with the upper surfaces of the flat leverage extensions substantially flush with the opposing surfaces of the handles in a plane substantially coinciding with the cutting plane of the scissors or shears, and a pivotal connection extending through the tubular studs and holding the handles connected with the flat leverage extensions of the blades in oversliding engagement maintaining the hollow curved portions of the blades tensioned in yielding engagement.

GEORGE V. ARNOLD.